(12) United States Patent
Wang et al.

(10) Patent No.: US 7,092,100 B2
(45) Date of Patent: Aug. 15, 2006

(54) QUADRATURE PHASE SHIFT INTERFEROMETER (QPSI) DECODER AND METHOD OF DECODING

(75) Inventors: Jianmin Wang, Fremont, CA (US); Jason L. Pressesky, Menlo Park, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 289 days.

(21) Appl. No.: 10/782,875

(22) Filed: Feb. 23, 2004

(65) Prior Publication Data

US 2005/0259769 A1    Nov. 24, 2005

(51) Int. Cl.
*G01B 9/02* (2006.01)

(52) U.S. Cl. ...................... 356/450; 356/495
(58) Field of Classification Search ............. 356/487, 356/491–495, 498, 512, 450
See application file for complete search history.

(56) References Cited

U.S. PATENT DOCUMENTS

| 4,019,818 | A | * | 4/1977 | Vilkomerson | ............... 356/493 |
| 5,710,631 | A | * | 1/1998 | Bou-Ghannam et al. | .... 356/495 |
| 5,883,714 | A | * | 3/1999 | Jann et al. | ................. 356/484 |
| 6,714,357 | B1 | * | 3/2004 | Yamazaki | .................... 359/696 |
| 2004/0196468 | A1 | * | 10/2004 | Wang et al. | ................ 356/495 |

* cited by examiner

*Primary Examiner*—Gregory J. Toatley, Jr.
*Assistant Examiner*—Patrick J Connolly
(74) *Attorney, Agent, or Firm*—McDermott Will & Emery LLP

(57) ABSTRACT

An arrangement and method for reliably finding the wave form extrema of interference signals produced by a quadrature phase shift interferometer (QPSI) takes advantage of the quadrature property of I and Q signals. The zero-crossing points in the I and Q signals are determined. Peak detection is performed for peaks and valleys in the Q signal in close proximity to the zero-crossing points in the I signal, and for peaks and valleys in the I signal in close proximity to the zero-crossing points in the Q signal. These represent the maximum and minimum points of the I and Q signals. From these points, intensity envelopes are created and QPSI phase wrapping is performed to determine the phase angle and ultimately, out-of-plane displacement may be determined.

20 Claims, 3 Drawing Sheets

QUADRATURE PHASE SHIFT INTERFEROMETER (QPSI) DECODER AND METHOD OF DECODING

FIELD OF THE INVENTION

The present invention relates to characterizing the topography of a surface, more particularly, to arrangements and methods for finding the waveform extrema of interference signals produced by a quadrature phase shift interferometer (QPSI). The location and value of these extrema are required in order to create accurate intensity envelopes, which are then used by a QPSI phase unwrapping algorithm.

BACKGROUND OF THE INVENTION

A form of an information storage and retrieval device is a hard disk drive (hereinafter "disk drive"). A disk drive is conventionally used for information storage and retrieval with computers, data recorders, redundant arrays of independent disks (RAIDs), multi-media recorders, and the like. A disk drive comprises one or more disk media.

Each disk medium comprises a substrate upon which materials are deposited to provide a magnetically sensitive surface. In forming a disk medium, a substrate is ground or polished, conventionally by chemical-mechanical or mechanical polishing, to provide a substantially planar surface. Layers of materials are substantially uniformly deposited on this substantially planar surface to provide magnetic properties for writing to and reading from the disk media.

However, defects, such as pits, voids, particles, bumps and scratches, among others, may arise on a disk medium surface. These defects affect the surface topography of the disk medium. These defects need to be detected and characterized. A number of different types of apparatus can be used to measure the surface topography. These include a Candela profilometer, a quadrature phase shift interferometer, or a laser doppler vibrometer, for example.

In particular, a quadrature phase shift interferometer is designed to provide an optical, non-contact testing method for inspecting a disk medium surface, or other ultra-smooth surface. Defects are detected and characterized by out-of-plane displacement. The interferometer described is able to measure out-of-plane displacements with nanometer resolution with frequency responses in a range of DC to hundreds of megahertz depending on detector rise time.

Phase angle calculation is an intermediate goal of a QPSI decoding algorithm. The ultimate goal of the QPSI is to measure out-of-plane displacement, which can be related to the phase angle through fundamental and well-known constants. One of the known methods used to resolve phase angle is the maximum/minimum intensity method. To employ this method, an accurate intensity envelope of the signal is required. A simple method to detect the intensity envelope uses the location of peaks and valleys within the signal. Curves are fitted through these peaks and valleys to create an intensity envelope. There are several peak/valley detection methods. The most commonly used method is the peak detector method. This method is based on an algorithm that fits a quadratic polynomial to sequential groups of data points from the signals produced by the detector. The peak detector method searches for a zero crossing in the first derivative of the signal in conjunction with the condition that the signal satisfies a threshold criterion at the location of the derivative zero crossing. However, referring now to FIG. 1, the method is easily confounded by false peaks and valleys that are present in the detected signals. In FIG. 1, a typical set of I and Q signals are depicted with modulated amplitude and corresponding ideal intensity envelopes.

According to conventional peak detection methods, the points a, b and c in FIG. 1 can be mistakenly identified by the peak detector as maximum and minimum intensity points, although they are not true maximum or minimum intensity points. Since the signal envelope will not be correctly identified, due to these false maximum and minimum intensity points, a significant decoding error will result.

SUMMARY OF THE INVENTION

There is a need for a decoding algorithm for a quadrature phase shift interferometer (QPSI) that identifies the true maximum and minimum intensity points of the interference signals produced by the QPSI so that the location and value of these extrema may be employed to create accurate intensity envelopes, which are then used by the QPSI phase unwrapping algorithm.

This and other needs are met by embodiments of the present invention which provide a method of determining extrema of interference signals produced by QPSI, comprising the steps of obtaining I and Q signals from the QPSI, determining zero-crossing points in the I signal, and peak detecting for peaks and valleys in the Q signal in close proximity to the zero-crossing points in the I signal, to thereby determine maximum and minimum points of the Q signal. The zero-crossing points are determined in the Q signal, and peak detecting is performed for peaks and valleys in the I signal in close proximity to the zero-crossing points in the Q signal, to thereby determine maximum and minimum points of the I signal.

The present invention takes advantage of the quadrature property of the I and Q signals, such that if one signal is at a peak or valley, the corresponding signal must be at a zero-crossing, and vice versa. With the true extrema located in the I and Q signals, accurate intensity envelopes are created. From the accurate intensity envelopes that are created, the QPSI phase unwrapping algorithm may then accurately perform a decoding.

The earlier stated needs are met by other embodiments of the invention that provide an arrangement for determining intensity envelopes of interference signals, comprising a QPSI that generates interference signals I and Q. A processor is configured to determine true maximum and minimum points from the interference signals I and Q to create intensity envelopes from the true maximum and minimum points.

The earlier stated needs are met by still other embodiments of the invention that provide a system for determining extrema of interference signals produced by a QPSI. The system comprises the QPSI that generates I and Q signals, and means for determining extrema of the I and Q signals based on zero-crossing points in the I and Q signals and detected peaks and valleys in the I and Q signals in close proximity to the zero-crossing points.

The foregoing and other features, aspects and advantages of the present invention will become more apparent in the following detailed description of the present invention when taken in conjunction with the accompanying drawings.

DETAILED DESCRIPTION OF THE INVENTION

The present invention addresses and solves problems related to determining the extrema of interference signals produced by a quadrature phase shift interferometer (QPSI) in the dynamic measurement of hard disk static surface topography. In particular, the present invention obtains the I and Q signals from the QPSI and determines the zero-crossing points in each of the respective signals. Peak detection is performed for the peaks and valleys in the Q signal in close proximity to the zero-crossing points of the I signal to accurately determine the maximum and minimum points of the Q signal. Similarly, peak detection is employed to determine the peaks and valleys in the I signal in close proximity to the zero-crossing points in the Q signal, to thereby determine the maximum and minimum points of the I signal. From the accurately determined maximum and minimum points of the I and Q signals, intensity envelopes are formed, such as by curve fitting. From the intensity envelopes, a QPSI phase unwrapping may be performed and a phase angle is determined based on the intensity envelopes. Out-of-plane displacement of a recording media disk can be calculated based upon the determined phase angle.

For purposes of explanation, an exemplary embodiment of a quadrature phase shift interferometer (QPSI) will be described with respect to FIG. 4. However, the invention may be applied to other examples of QPSI arrangements, as will be recognized by one of ordinary skill in the art. The QPSI arrangement of FIG. 4 provides I and Q signals, such as the exemplary signals depicted in FIG. 1.

Figure 4:
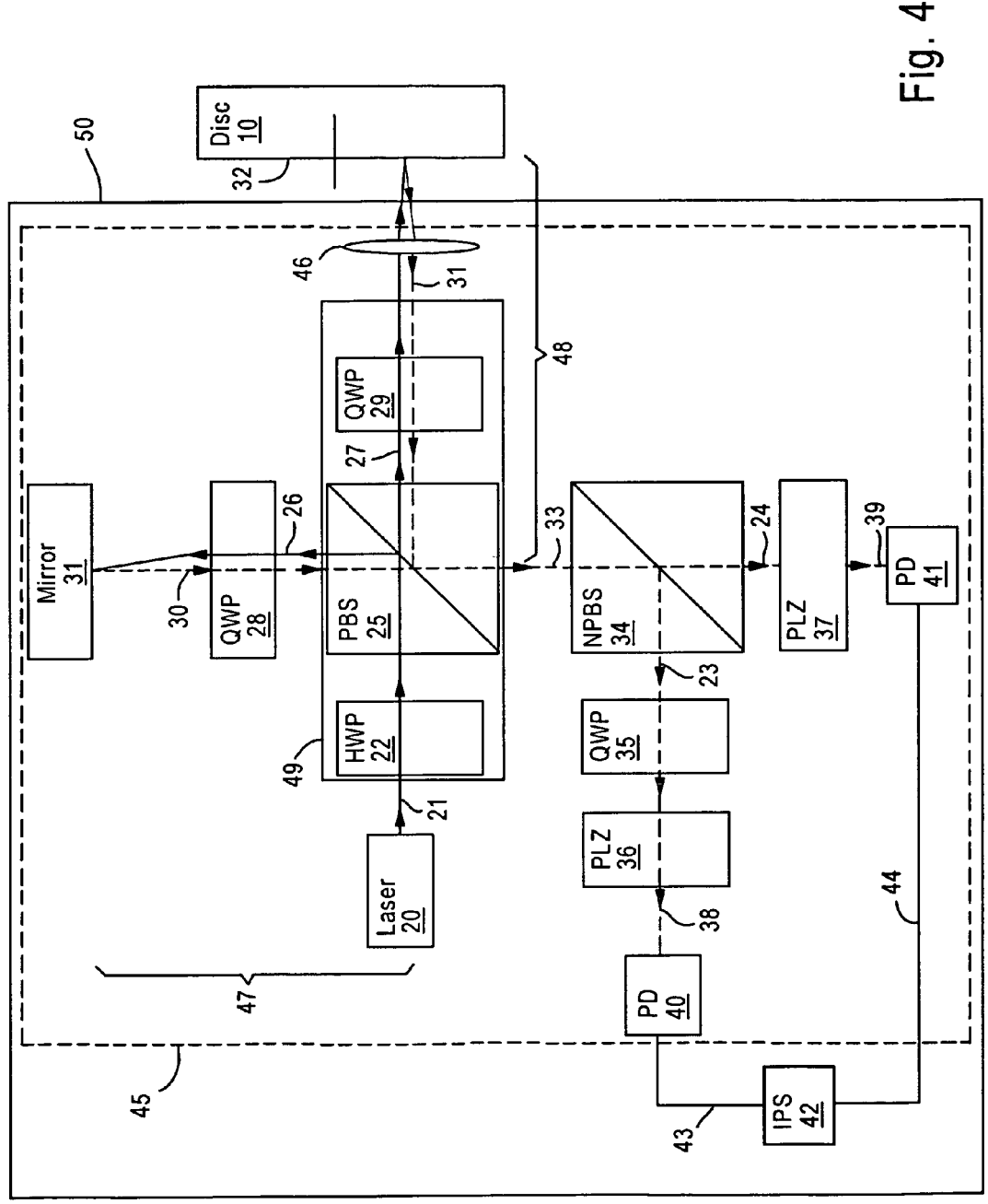
FIG. 4 is an optical layout of an exemplary portion of an embodiment of an exemplary arrangement of an apparatus that can be employed with the present invention.

FIG. 4 is an optical layout of an exemplary portion of an embodiment of an interferometer system 50 in accordance with one or more aspects of the present invention. As will be understood, interferometer system 50, or more particularly quadrature phase shift interferometer 45, uses two polarization processes to create two independent interference signals, which are phase shifted with respect to one another. The presence of two independent signals in phase quadrature facilitates unwrapping of phase.

With continuing reference to FIG. 4, laser or laser beam source 20 is configured to provide a laser or other optical energy beam 21. Laser 20 may be configured to provide a linearly polarized laser beam. For example, a Helium-Neon (He—Ne) laser may be used, though it should be understood that the present invention may be used with known lasers of other wavelengths. Laser beam 21 is a linearly polarized laser beam. Laser beam 21 is provided to variable ratio beam splitter 49.

Variable ratio beam splitter 49 comprises a polarizing beam splitter (PBS) 25 and half-wave plate (HWP) 22. Notably, half-wave plate 22 is configured to rotate. By rotating half-wave plate 22, relative intensity or amplitude of reference beam 26 and object beam 27 may be adjusted. Half-wave plate 22 is used to rotate the direction of polarization of laser beam 21 with respect to polarizing beam splitter 25. In other words, direction of orientation is adjusted such that polarizing beam splitter receives components of s-polarization and p-polarization. Laser beam 21 is provided to half-wave plate 22 and then to polarizing beam splitter 25. Polarizing beam splitter 25 splits laser beam 21 into a reference beam 26 and an object or measurement beam 27 according to s-polarization and p-polarization components. An aspect of the present invention is to balance intensity of reference beam 26 and object beam 27. Alternatively, half-wave plate 22 may be removed and direction of polarization controlled by rotation of laser 20.

Reference beam 26 and object beam 27 are polarized beams with polarizations perpendicular or orthogonal to one another. Thus, reference beam 26 may comprise only the s-polarized component of laser beam 21 and object beam 27 may comprise only the p-polarized component. Notably, reference beam 26 and object beam 27 are interchangeable.

Reference beam 26 is provided to quarter-wave plate (QWP) 28 and then to mirror 31. Reference beam 26 enters a passive side of quarter-wave plate 28. Reference beam 26 is reflected off an optically reflective surface of mirror 31 to provide reflected reference beam 30, as shown with a dashed line. For purposes of clarity, beams post-reflection and pre-recombination are shown with a dashed line.

Reflected reference beam 30 is provided to quarter-wave plate 28. Quarter-wave plate 28, as well as quarter wave-plate 29, are used to reduce power loss due to subsequent combination of reflected reference beam 30 and reflected object beam 31, respectively. Reference beam 26 immediately prior to passing through quarter-wave plate 28 comprises only linear polarization, namely s-polarization, components. After passing through quarter-wave plate 28, reference beam 26 linear polarization components are converted to circular polarization components. Reflected reference beam 30 immediately prior to passing through quarter-wave plate 28 comprises only circular polarization components. After passing through quarter-wave plate 28, reflected reference beam 30 circular polarization components are converted to linear polarization, namely p-polarization, components, and thus reflected reference beam with p-polarization components passes straight through polarizing beam splitter 25 for providing a portion of combinative beam 33.

Object beam 27 is provided to a passive side of quarter-wave plate 29 and then to lens 46. Lens 46 is used to reduce spot size of object beam 27 for imaging of surface 32 of disk medium 10. Spot size determines resolution for inspection purposes, and thus a smaller spot size allows smaller defects to be resolved. Focused object beam 27 from lens 46 leaves interferometer system 50 and then is reflected from surface 32 to re-enter interferometer system 50 back to lens 46, where it is reset to approximately the same spot size prior to focusing. Disk 10 is a moving, such as rotating, target. From lens 46, reflected object beam 31 is provided to quarter-wave plate 29. Object beam 27 immediately prior to passing through quarter-wave plate 29 comprises only p-polarization components. After passing through quarter-wave plate 29, object beam 27 comprises only circular polarization components. Reflected object beam 31 immediately prior to passing through quarter-wave plate 29 comprises only circular polarization components. After passing through quarter-wave plate 29, reflected object beam 31 comprises only s-polarization components, and thus as reflected object beam 31 enters from a side opposite to that of original entry to polarizing beam splitter 25, it is orthogonal diverted by polarizing beam splitter 25 in a direction opposite to that of reference beam 26 for providing a portion of combinative beam 33.

Notably, the difference in optical path length 48 and optical path length 47 is less than laser beam coherence length. Furthermore, it should be understood that surface defects on surface 32 causes displacement in optical path length 48. For example, depending on reference level, a depression lengthens optical path length 48, both with respect to object beam 27 and reflected object beam 31, while a bump shortens optical path length 48. Maximum allowed displacement is limited by focus depth of lens 46. Optical path length 48 is modulated by surface 32, if surface 32 is moving. Optical path length 48 is modulated by out-of-plane, or more particularly out-of-reference plane, movement of surface 32.

Reflected reference beam 30 and reflected object beam 31 are combined by polarizing beam splitter 25 to provide combinative beam 33. Combinative beam 33 comprises a reflected reference beam portion and a reflective object beam portion, as respective polarization directions of these portions are orthogonal. In other words, the reflected reference beam portion and the reflective object beam portion in combinative beam 33 do not interfere with one another.

Combinative beam 33 is provided from polarizing beam splitter 25 to non-polarizing beam splitter 34 (NPBS). Non-polarizing beam splitter 34 amplitude splits combinative beam 33 into output beam 23 and output beam 24.

One of output beam 23 or 24 is provided to a quarter-wave plate. In the embodiment shown in FIG. 4, output beam 23 is provided to quarter-wave plate 35. Quarter-wave plate 35 introduces a phase shift between reflected reference and reflected object beam portions or components of output beam 23. Quarter-wave plate 35 may be adjustable. Thus, for example, quarter-wave plate 35 could be adjusted, as needed, to introduce a target phase shift, for example approximately 90 degrees, between reflected reference and reflected object beam components of output beam 23. Because two waves phase shifted with respect to one another are used, unwrapping of phase is facilitated. Such a phase shift is used for providing a quadrature output, as stated above. However, if outputs were viewed only in parallel, then quarter-wave plate 35 may be omitted. Notably, reflected reference and reflected object beam components of output beam 23, or output beam 24 for that matter, are still orthogonally polarized with respect to one another.

Polarizer 36 receives phase-shifted output beam 23 and assembles its reflected reference and reflected object beam components along a predetermined direction, for example approximately 45 degrees, to the vertical and horizontal axes of polarization of such components to provide assembled beam 38. As mentioned above HWP 22 is used to balance the beams, but if such beams were out of balance, a predetermined direction or angle may be selected or adjusted to enhance contrast of the interference. So, if reflected object and reference beam components are out of balance, then another angle may be selected to enhance the contrast by equalizing contributions of each such component in assembly of assembled beam 38. Assembled beam 38 may have interference between assembled reflected reference and reflected object beam components in response to displacement in optical path length 48 caused by surface defects or other surface inconsistencies, or from a nominal surface condition depending on reference plane selection, as mentioned above.

Polarizer 37 receives output beam 24 and assembles its reflected reference and reflected object beam components along a predetermined direction, for example approximately 45 degrees, to the vertical and horizontal axes of polarization of such components to provide assembled beam 39. Assembled beam 39 may have interference between assembled reflected reference and reflected object beam components in response to displacement in optical path length 48 caused by surface defects or other surface inconsistencies, or from a nominal surface condition, as mentioned above.

Assuming surface defects exist and are detected, reflected reference and reflected object beam components interfere in assembled beams 38 and 39 to produce moving fringes representing modulation of optical path length 48. Such moving fringes, which are temporal variation in light intensity, may be observed in both output beams 38 and 39 in parallel. Alternatively, such moving fringes may be observed in both assembled beams 38 and 39 in parallel and in phase quadrature.

Assembled beams 38 and 39 are provided to optical detectors 40 and 41, respectively. Optical detectors 40 and 41 may be photodiode detectors. Detectors 40 and 41 operate at a speed sufficient to capture fringes from assembled beams 38 and 39 and deliver respective voltages proportional to temporal light intensity change as signals 43 and 44, respectively, for subsequent digital signal processing by information processing system (IPS) 42.

Figure 5:
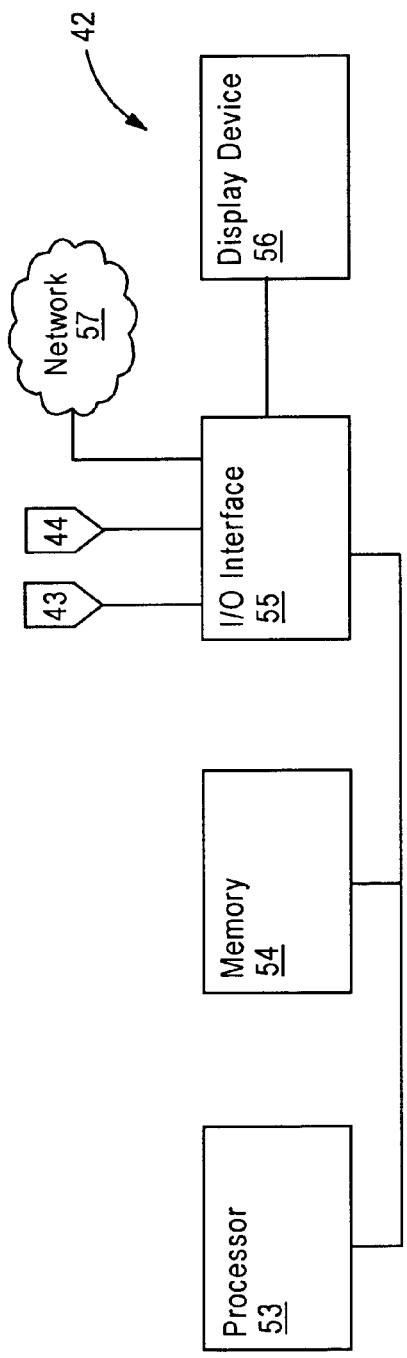
FIG. 5 is a block diagram of an information processing system for performing the method of the present invention.

Referring to FIG. 5, there is shown a block diagram of an exemplary portion of an embodiment of an information processing system 42 configured to receive light intensity voltage signals 43 and 44 in accordance with one or more aspects of the present invention. Information processing system comprises processor 53, memory 54, input/output interface 55 and display device 56. Information processing system 42 may be a programmed personal computer or a digital oscilloscope or other known device for processing signals of the form of signals 43 and 44.

The QPSI design is based on the principle of using the polarization property of the light to create two independent interference signals I and Q which are phase shifted by 90° with respect to one another. These two signals are represented by:

$$I = I_o + I_r + 2\sqrt{I_o I_r} \cdot \cos(\phi) \tag{0}$$

$$Q = Q_o + Q_r + 2\sqrt{Q_o Q_r} \cdot \cos(\phi)$$

where, $I_o$ and $I_r$, $Q_o$ and $Q_r$ are the intensities of the object and reference means, respectively. The $\phi$ symbol is the phase angle between the object and reference beam. In these equations, all parameters are unknown, except for I and Q, which are detected by the photo detectors. The phase angle $\phi$ is the unknown that needs to be resolved, because it carries the object displacement (out-of-plane) information. Signals 43 and 44, as mentioned above, represent temporal interference fringes formed in response to temporal phase difference, $\phi$, between reflected reference beam 30 and reflected object beams 31. Temporal phase difference or phase, $\phi$, is a function of object displacement, d, namely displacement caused by disk medium surface 32 out-of-plane motion. This relationship may be expressed as, $$\phi = (4\pi d)/\lambda \tag{1}$$

where wavelength, $\lambda$, is the wavelength of laser beam 21. Notice that if displacement, d, equals 0, then phase $\phi$ equals 0, or in other words disk medium surface 32 is flat, which may be taken as a reference location. However, it is not necessary to take the flat or unaffected portion of a disk media surface 32 as a reference location or plane. Accordingly, it should be understood that displacement, d, is a value depending on a reference location. Thus, displacement d is actually a change in displacement, Δd, with respect to such a reference location. Likewise, phase, φ, is actually a change in phase, Δφ, due to change in displacement.

Assuming interferometer system 50 is properly aligned and adjusted, intensity I received at optical detector 40 and intensity Q received at optical detector 41 may be represented as, $$I = I_a + I_b \cos(\phi) \tag{2A}$$

$$Q = Q_a - Q_b \sin(\phi) \tag{2B}$$

where, $$I_a = (I_{max} + I_{min})/2 \tag{3A}$$

$$I_b = (I_{max} - I_{min})/2 \tag{3B}$$

$$Q_a = (Q_{max} + Q_{min})/2 \tag{3C}$$

$$Q_b = (Q_{max} - Q_{min})/2 \tag{3D}$$

where $I_{max}$ and $I_{min}$ are the maximum and minimum intensities of the I beam, namely assembled beam 38, and where $Q_{max}$ and $Q_{min}$ are the maximum and minimum intensities of the Q beam, namely assembled beam 39.

Therefore, we can solve the equation (0) or (2), provided that we can find $I_{max}$ and $I_{min}$ and $Q_{max}$ and $Q_{min}$ respectively. The approach described here provides a reliable method for finding the values of the true maxima and minima of the interference signals. This method is described in details in the following paragraphs.

Because phase angle is used as the argument for a sine and a cosine function as in Equations (2A) and (2B) [collectively "Equations (2)"], phase wrapping occurs. In other words, phase wraps around to the same value for every 2π increase or decrease. To obtain the actual phase in Equation (1), phase from Equations (2) must be unwrapped. However, because phase φ directly resolved from Equations (2) yield the principal value of phase, the first step of unwrapping phase is to calculate the phase angle and extend it into a 0 to 2π phase range. To calculate phase angle in a 0 to 2π phase range, phase is calculated according to rules or boundary conditions of Equations (4A) and (4B) for phase angle of assembled beam 38, $$\phi = \cos^{-1}[(I - I_a)/I_b] \text{ for } Q - Q_a \leq 0 \tag{4A}$$

$$\phi = 2\pi - \cos^{-1}[(I - I_a)/I_b] \text{ for } Q - Q_a > 0 \tag{4B}$$

and Equations (5A), (5B) and (5C) for phase angle of assembled beam 39, $$\phi = \sin^{-1}[(Q_a - Q)/Q_b] \text{ for } I - I_a \geq 0 \text{ and } Q - Q_a \leq 0 \tag{5A}$$

$$\phi = \pi - \sin^{-1}[(Q_a - Q)/Q_b] \text{ for } I - I_a < 0 \tag{5B}$$

$$\phi = 2\pi + \sin^{-1}[(Q_a - Q)/Q_b] \text{ for } I - I_a \geq 0 \text{ and } Q - Q_a > 0 \tag{5C}$$

Figure 2:
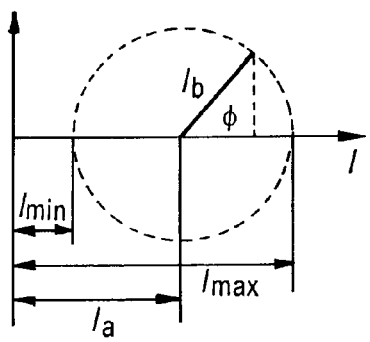
FIG. 2 displays a graphical interpretation of the I and Q signal equations.

The present invention provides a reliable method for finding the values of true maxima and minima of the interference signals. The method is based on the quadrature property of I and Q signals, which is that if one signal is at a peak or valley, the corresponding signal must be at a zero crossing, and vice versa. It is assumed in this embodiment that the I and Q signals are AC coupled to the digitizer such that their base lines will be close to the value zero. The equations of 2A and 2B have a graphical interpretation shown in FIG. 2. From this figure, it is clear to see that equations 3A–3D result.

Figure 1:
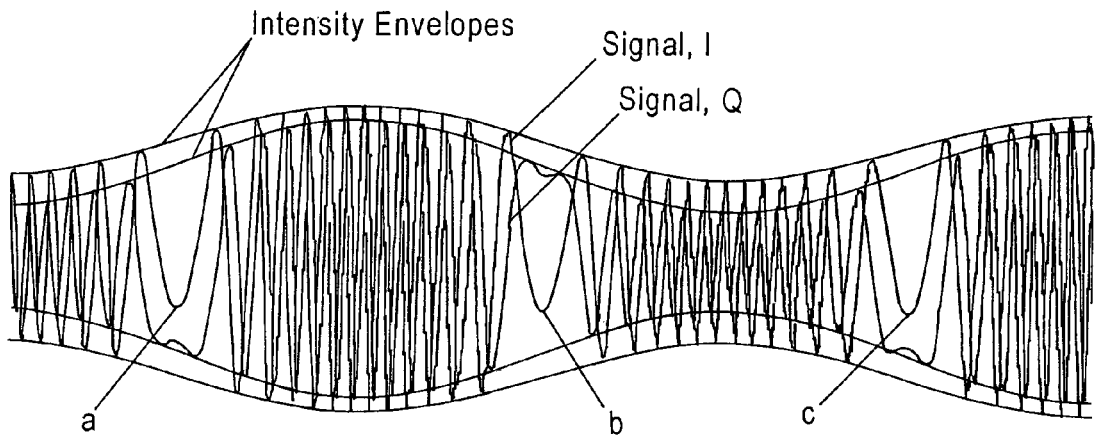
FIG. 1 is an exemplary set of I and Q signals with modulated amplitude and corresponding ideal intensity envelopes as taken by a QPSI detector.
Figure 3:
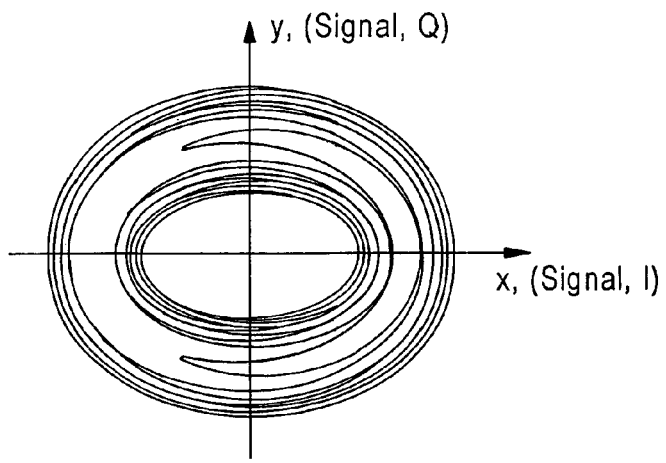
FIG. 3 is a re-plot of the signals from FIG. 1 with the Q signal being displayed as a function of the I signal.

FIG. 3 re-plots the signals from FIG. 1 such that Q is shown as a function of I. This plot consists of either circles or ellipses, depending upon the amplitude ratio of the signals I and Q. An x-y axis is located at the point I=0, Q=0. All of the true extreme of the Q signal are located on the y-axis in FIG. 3, and all of the true extreme of the I signal are located on the x-axis.

Figure 6:
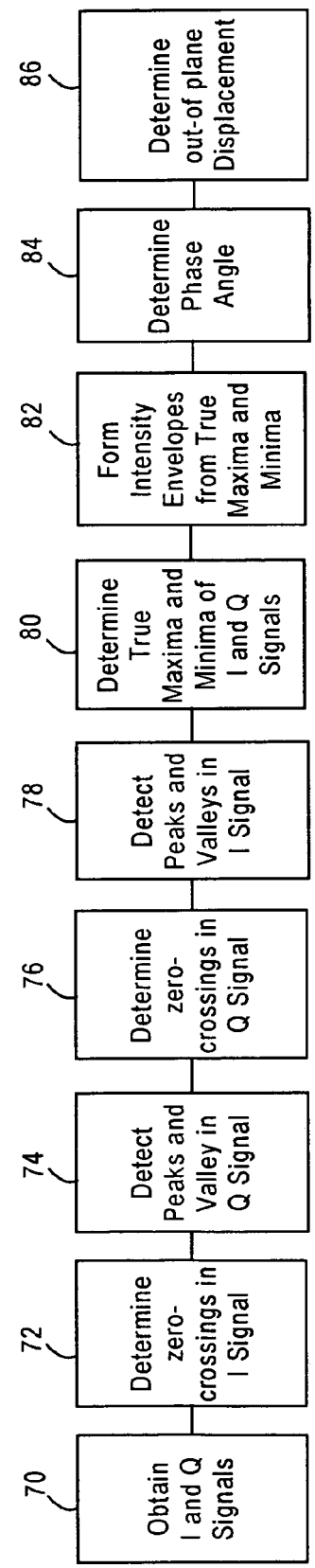
FIG. 6 is a flow chart describing steps for determining the extrema of interference signals produced by a QPSI in accordance with embodiments of the present invention.

FIG. 6 is a flow chart of an exemplary method for determining the out-of-plane displacement in accordance with embodiments of the present invention. This method is performed by the processor 53 of FIG. 5 based upon the signals from the QPSI detector.

In FIG. 6, the method starts in step 70 with the obtaining of the I and Q signals from the QPSI detector, such as that shown in FIG. 4. The processor 53 determines zero-crossing points in one of the signals in step 72. In the exemplary embodiment described in FIG. 6, the zero-crossing points are determined in the I signal in this step. The peaks and valleys in the Q signal are then detected in step 74. These peaks and valleys are those that are determined to be in close proximity to the zero-crossing points in the I signal detected in step 72.

In step 76 the zero-crossing points in the Q signal are determined. In step 78 the peaks and valleys in the I signal in close proximity to the zero-crossing point to the Q signal are detected by peak detection.

From the detected peaks and valleys in the I and Q signals that are located in close proximity to the zero-crossing points of the other respective signals, processor 53 determines the true maximum and minimum points of the I and Q signals respectively, in step 80. From these true maximum and minimum plants of the I and Q signals, intensity envelopes are formed in step 82 by the processor 53. The forming of the intensity envelopes includes curve fitting to respectively link: the maximum points of the Q signal; the minimum points of the Q signal; the maximum points of the I signal; and the minimum points of the I signal. The curve fitting may be performed by selecting a curve fitting method based on decoding error analysis. In certain embodiments of the invention, a second order polynomial curve fit to a segment of every three detected extrema points provides satisfactory results. Following the determination of the true maximum and minimum points of the I and Q signals, equations 3A–3D may be resolved.

Hence, the process continues to step 84 in which the phase angle is determined by the processor 53. Finally, in step 86, out-of-plane displacement is determined from the previously determined phase angle.

The above-described methodology is exemplary only, as the order of determining the peaks and valleys in the I and Q signals may be switched. In other words, steps 72, 74 may be performed after steps 76, 78.

With the present invention, the quadrature property of I and Q signals is utilized to determine the points of true maximum and minimum intensity of the interference signals and to create accurate intensity envelopes of the interference signals. The invention provides a scheme for detecting the maximum and the minimum value and location accurately and may be employed with any number of different QPSI arrangements.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A method of determine extrema of interference signals produced by a quadrature phase shift interferometer (QPSI), comprising the steps of:
   obtaining I and Q signals from the QPSI;
   determine zero-crossing points in the I signal;
   peak detecting for peaks and valleys in the Q signal in close proximity to the zero-crossing points in the I signal, to thereby determine maximum and minimum points of the Q signal;
   determining zero-crossing points in the Q signal, and
   peak detecting for peaks and valleys in the I signal in close proximity to the zero-crossing points in the Q signal, to thereby determine maximum and minimum points of the I signal.

2. The method of claim 1, further comprising forming intensity envelopes from the determined maximum and minimum points of the I and Q signals.

3. The method of claim 2, wherein the step of forming intensity envelopes includes curve fitting to respectively link: the maximum points of the Q signal; the minimum points of the Q signal; the maximum points of the I signal; and the minimum points of the I signal.

4. The method of claim 3, wherein the step of curve fitting include selecting a curve fitting method based on decoding error analysis.

5. The method of claim 3, wherein the step of curve fitting includes performing second order polynomial curve fitting.

6. The method of claim 2, further comprising performing QPSI phase unwrapping using the intensity envelopes.

7. The method of claim 6, further comprising determining phase angle based on the intensity envelopes.

8. The method of claim 7, further comprising determining out-of-plane displacement of a recording media disk based on the determined phase angle.

9. An arrangement for determining intensity envelopes of interference signals, comprising:
   a quadrature phase shift interferometer (QPSI) that generates interference signals I and Q; and
   a processor configured to determine true maximum and minimum points from the interference signals I and Q and to create intensity envelopes from the true maximum and minimum points.

10. The arrangement of claim 9, wherein the processor is further configured to determine zero-crossing points in the I signal and detecting each maximum and minimum points of the Q signal located within close proximity at each zero-crossing point in the I signal, and to determine zero-crossing points in the Q signal and detecting each maximum and minimum point of the I signal located within close proximity of each zero-crossing point in the Q signal.

11. The arrangement of claim 10, wherein the processor is further configured to form curves from the detected maximum and minimum points of the I and Q signals.

12. The arrangement of claim 11, wherein the processor is further configured to form the curves by a curve fitting method.

13. The arrangement of claim 12, wherein the curve fitting method is a second order polynomial curve fitting method.

14. The arrangement of claim 13, wherein the processor is further configured to determine phase angle based on the created intensity envelopes.

15. The arrangement of claim 14, wherein the processor is further configured to determine out-of-plane displacement based on the determined phase angle.

16. A system for determining extrema of interference signals produced by a quadrature phase shift interferometer (QPSI), comprising:
   a QPSI that generates I and Q-signals; and
   means for determining extrema of the I and Q signals based on zero-crossing points in the I and Q signals and detected peaks and valleys in the I and Q signals in close proximity to the zero-crossing points.

17. The system of claim 16, wherein the means for determining further includes means for forming intensity envelopes from the determined extrema.

18. The system of claim 17, wherein the means for determining further includes means for peak detecting for the peaks and valleys in close proximity to the zero-crossing points.

19. The system of claim 18, wherein the means for peak detecting includes means for peak detecting the for the peaks and valleys in the I signal that are in close proximity to the zero-crossing points in the Q signal, and for the peaks and valleys in the Q signal that are in close proximity to the zero-crossing points in the I signal.

20. The system of claim 19, further comprising means for forming intensity envelopes from the determined extrema and performing a phase unwrapping based on the intensity envelopes.

* * * * *